US006629035B2

(12) United States Patent
Seto et al.

(10) Patent No.: US 6,629,035 B2
(45) Date of Patent: Sep. 30, 2003

(54) NAVIGATION SYSTEM FOR VEHICLE

(75) Inventors: Fumio Seto, Tokyo (JP); Masayuki Takada, Gunma-ken (JP); Takuo Ishiwaka, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/187,377

(22) Filed: Jul. 2, 2002

(65) Prior Publication Data

US 2003/0050752 A1 Mar. 13, 2003

(30) Foreign Application Priority Data

Jul. 4, 2001 (JP) .................................... P2001-203935

(51) Int. Cl.[7] ......................... G01C 21/32; G09B 29/10

(52) U.S. Cl. ....................... 701/208; 701/213; 340/990; 340/991; 340/995.15; 340/995.17; 342/357.08; 342/357.09; 342/357.1; 345/818; 345/850

(58) Field of Search ................................ 701/208, 209, 701/211, 212, 213, 214, 200; 340/988, 990, 991, 992, 995.1, 995.11, 995.15, 995.17; 342/357.09, 357.08, 357.1, 357.13; 345/818, 850

(56) References Cited

U.S. PATENT DOCUMENTS 5,699,255 A * 12/1997 Ellis et al. .................. 342/450
5,731,979 A * 3/1998 Yano et al. ................. 340/995
6,023,652 A * 2/2000 Arakawa et al. ............ 701/201
6,052,645 A 4/2000 Harada ....................... 701/212
6,061,003 A * 5/2000 Harada ....................... 340/995
6,067,502 A * 5/2000 Hayashida et al. ......... 701/209
6,115,611 A 9/2000 Kimoto et al. .............. 455/456
6,246,958 B1 6/2001 Hirono ....................... 701/208
2001/0016796 A1 * 8/2001 Ata et al. .................... 701/208
2002/0082773 A1 * 6/2002 Ikeuchi et al. .............. 701/211

FOREIGN PATENT DOCUMENTS

| | | | |
|---|---|---|---|
| EP | 1035531 | A2 | 9/2000 |
| JP | 11-38872 | | 2/1999 |
| JP | 2000-251196 | | 9/2000 |
| JP | 2001-82965 | | 3/2001 |
| JP | 2001-311626 | | 11/2001 |
| JP | 2002-202135 | | 7/2002 |
| JP | 2002-213990 | | 7/2002 |
| WO | WO 01/01370 | A1 | 1/2001 |

* cited by examiner

*Primary Examiner*—Thomas G. Black
*Assistant Examiner*—Tuan C To
(74) *Attorney, Agent, or Firm*—McDermott, Will & Emery

(57) ABSTRACT

A navigation system 2 includes a map-gain timing judging part 15 to calculate a traveling speed the position of a vehicle detected by a GPS unit 13. A moving distance of the vehicle during the renewal of map is calculated by the traveling speed and a renewal time necessary for gaining the map information from the server 11 of a map information delivery apparatus 1. The system 2 further calculates a traveling direction of the vehicle by the position of the vehicle and also calculates a road distance from the present position of the vehicle to the margin of a map on display. When the road distance agrees with moving distance, it is started to gain a new map information from the server. Thus, when the vehicle reaches the margin of the map on display, the renewal of the map information is completed.

13 Claims, 5 Drawing Sheets

NAVIGATION SYSTEM FOR VEHICLE

BACKGROUND OF THE INVENTION

1. Field of the Invention

The present invention relates to a navigation system for a vehicle, such as vehicle.

2. Description of the Related Art

Recently, there has been developed a delivery service to deliver the map information to users by means of an internet system. In the field of navigation system, a study to obtain the map information for a user's object through such a delivery service for map information is being carried out.

Japanese Patent Application Laid-open No. 2000-251196 discloses a system where the positional information guiding a route from the starting point to a user's destination is transmitted to a server that delivers the map information to users via an internet. Subsequently, the corresponding map information is delivered (down-load) from the server to the user's navigation system.

Japanese Patent Application Laid-open No. 2001-82965 discloses another system where the positional information of a vehicle (e.g. user's vehicle) is transmitted to the server and then, a predetermined area of map information corresponding to the positional information is returned to the user.

Thus, in common with the above systems utilizing the map information loaded from the server, it is unnecessary to possess the map information in advance and is possible to utilize a brand-new map information anytime.

In the former system (No. 2000-251196), however, a problem of impossibility to gain the map information will arise unless the guidance route is determined.

In the latter system (No. 2001-82965), since the server delivers only the map information corresponding to the present position of the vehicle, a problem arises when a further movement of the vehicle requires a new map information. In detail, if it is started to gain the next map information when the vehicle goes out of the area of a map on display, there is produced a state of vacant display (map vacuum) because it takes much time to collate the user's code number with the server's code number, including the delivery of new map information.

In order to solve the above problems, it is supposed that the server delivers the map at regular intervals. However, if the vehicle moves slower than an estimated speed, then the map information having overlapped areas is transmitted to the user excessively, causing a rental fee about the map information to be elevated.

SUMMARY OF THE INVENTION

Under the above circumstance, it is an object of the present invention to provide a navigation system which allows the map information to be delivered (down-load) to a user in appropriate time with the moving situation of a vehicle.

According to the present invention, the above-mentioned object is accomplished by a navigation system for a vehicle, comprising:

a communication unit connected to a server for delivering a map information;

a map gaining unit connected to the communication unit thereby to gain the map information from the server through the communication unit;

a display unit connected to the map gaining unit thereby to display the map information gained by the map gaining unit, in the form of a map image;

a position detecting unit for detecting the position of the vehicle;

a renewal time calculating unit for calculating a renewal time necessary to renew the map, the renewal time including a time for gaining the map information;

a moving distance calculating unit for calculating a moving distance of the vehicle traveling during the renewal of the map;

a road distance calculating unit for calculating a road distance required for the vehicle to travel from its present position to a margin of the map displayed on the display unit;

a comparing unit for comparing the road distance with the moving distance; and an extraction-area setting unit for establishing the area of a new map to be displayed next to the map presently displayed on the display unit when the road distance agrees with the moving distance;

wherein the map gaining unit transmits information about the area of the new map established by the extraction-area setting unit, to the server through the communication unit and further gains a new map information from the server thereby to carry out the renewal of the map displayed on the display unit.

DESCRIPTION OF THE PREFERRED EMBODIMENT

Referring to accompanying drawings, an embodiment of the present invention will be described below.

Figure 1:
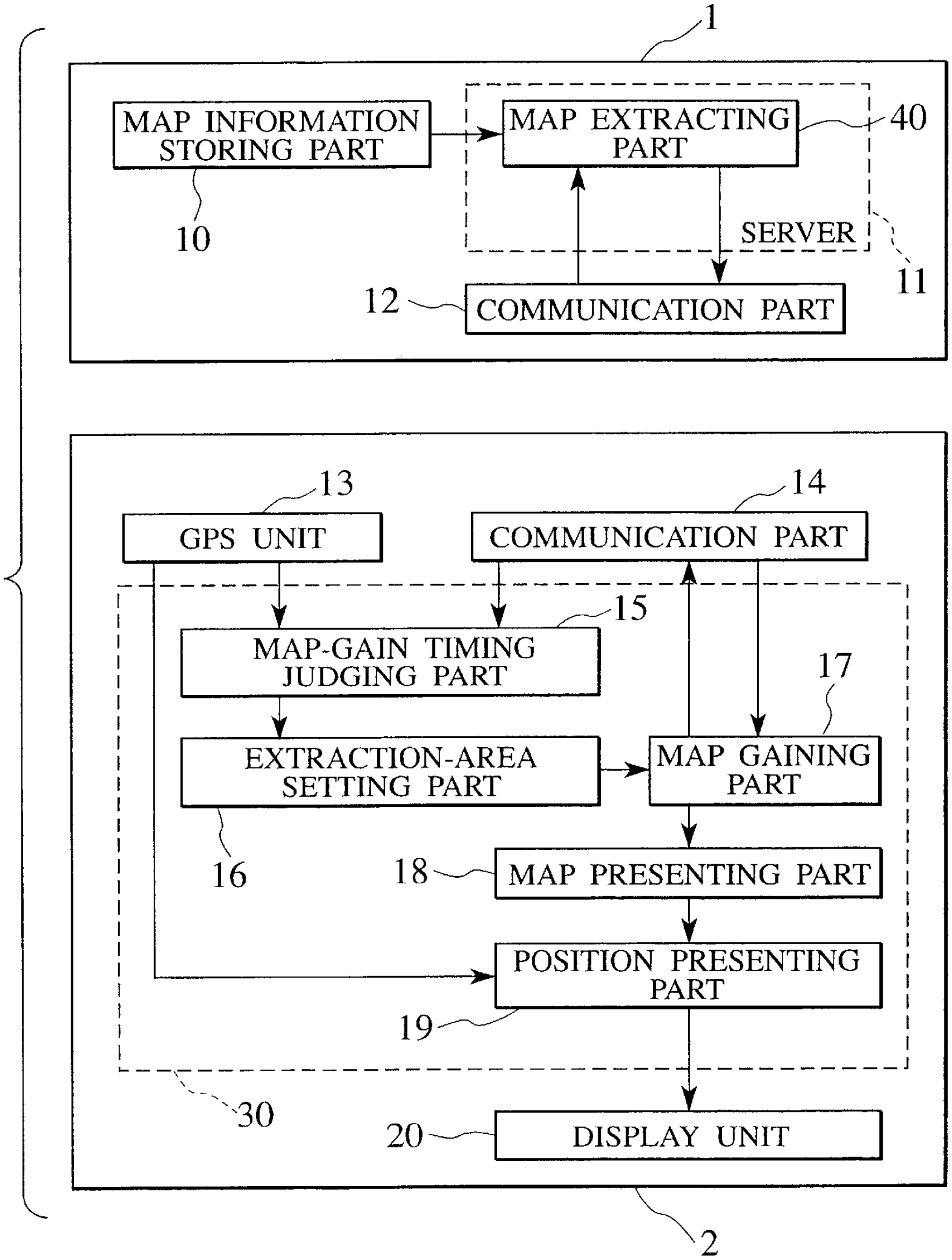
FIG. 1 is a block diagram of a navigation system in accordance with an embodiment of the present invention.

Now referring to FIG. 1, a map information delivery apparatus 1 includes a server 11, a map information storing part (unit) 10 and a communication part (unit) 12 both of which are connected to the server 11. Stored in the map information storing part 10 is a map information which consists of a road information, a geographical information, an institution information, etc. Functionally, the server 11 includes a map extracting part (unit) 40. Based on the present position and the area information transmitted from the user's side, the map extracting part 40 operates to extract the corresponding map information from the map information storing part 10 and successively transmits the extracted information to the outside through the communication part 12. Besides the transmission of the map information, the communication part 12 has also a function to collate code numbers with each other in case of communicating with the other communication part (not shown).

A navigation system 2 is mounted on a vehicle as one vehicle and includes a GPS unit 13, a communication part (unit) 14, a computer 30 and a display unit 20. In operation, on a basis of the vehicle's position detected by the GPS unit 13, the computer 30 operates to illustrate the map with a cursor indicating the vehicle's position. Further, if it is judged that the present map should be renewed, then the computer 30 operates to take in (down-load) a new map information from the map information delivery apparatus 1 through the communication part 14 and further renews the map displayed on the display unit 20. Functionally, the computer 30 includes a map-gain timing judging part (unit) 15, an extraction-area setting part (unit) 16, a map gaining part (unit) 17, a map presenting part (unit) 18 and a position presenting part (unit) 19.

Through the intermediary of a not-shown GPS antenna, the GPS unit 13 receives a radio wave, which has been transmitted from a satellite at regular intervals (e.g. one second) to detect the present position of the user's vehicle.

The communication part 14 exchanges radio messages with base stations and further measures an electric field strength periodically. When the so-detected electric field strength is relatively weak, the communication part 14 degrades a communication/transfer rate to ensure the quality of communication itself. Additionally, the communication part 14 is adapted so as to carry out the confirmation of personal code numbers with the other party to be communicated.

Based on the present position of the user's vehicle measured by the GPS unit 13, the map-gain timing judging part 15 calculates a traveling speed of the vehicle. Further, the part 15 calculates a renewal time required to renew the map with a certification time of the code numbers and a time for taking in (down-load) the map information and, if necessary, the part 15 also calibrates the so-calculated renewal time by using the electric field strength. Thereupon, by the communication/transfer rate and the traveling speed of the vehicle, the map-gain timing judging part 15 further calculates a moving distance that the vehicle travels during renewing the map. In this way, the map-gain timing judging part 15 judges a timing of renewing the map upon comparing the above moving distance with a road distance that the vehicle travels from the present position up to the margin of a map on display.

Owing to the vehicle's position indicated on the map and the traveling direction of the vehicle, the extraction-area setting part 16 calculates both center and area of the map information as the information about extraction area.

Through the communication part 14, the map gaining part 17 transmits the extraction area information calculated at the extraction-area setting part 16 to the map information delivery apparatus 1 to extract (down-load) the corresponding map information therefrom.

The map presenting part 18 inputs the map information brought (down-load) from the map gaining part 17 and further converts the inputted map information to an image data.

The position presenting part 19 performs an image processing to add a cursor representing the present position of the vehicle into the map information in the form of converted image data.

The display unit 20 displays the map information with the so-added cursor.

Next, the operation of the above-mentioned apparatus and system will be described with reference to a flow chart of FIG. 2.

First of all, when the navigation is powered on, the map-gain timing judging part 15 takes in the measured values at the GPS unit 13 to obtain the information about the present position of the vehicle at step 100 and then, the routine goes to step 101 to obtain the information about electric field strength through the communication part 14.

At step 102, the map-gain timing judging part 15 calculates a timing to gain the map on the ground of the information about the present position of the vehicle and the electric field strength.

Here, the map information expressed by bit map data is gained as the map information.

Figure 3:
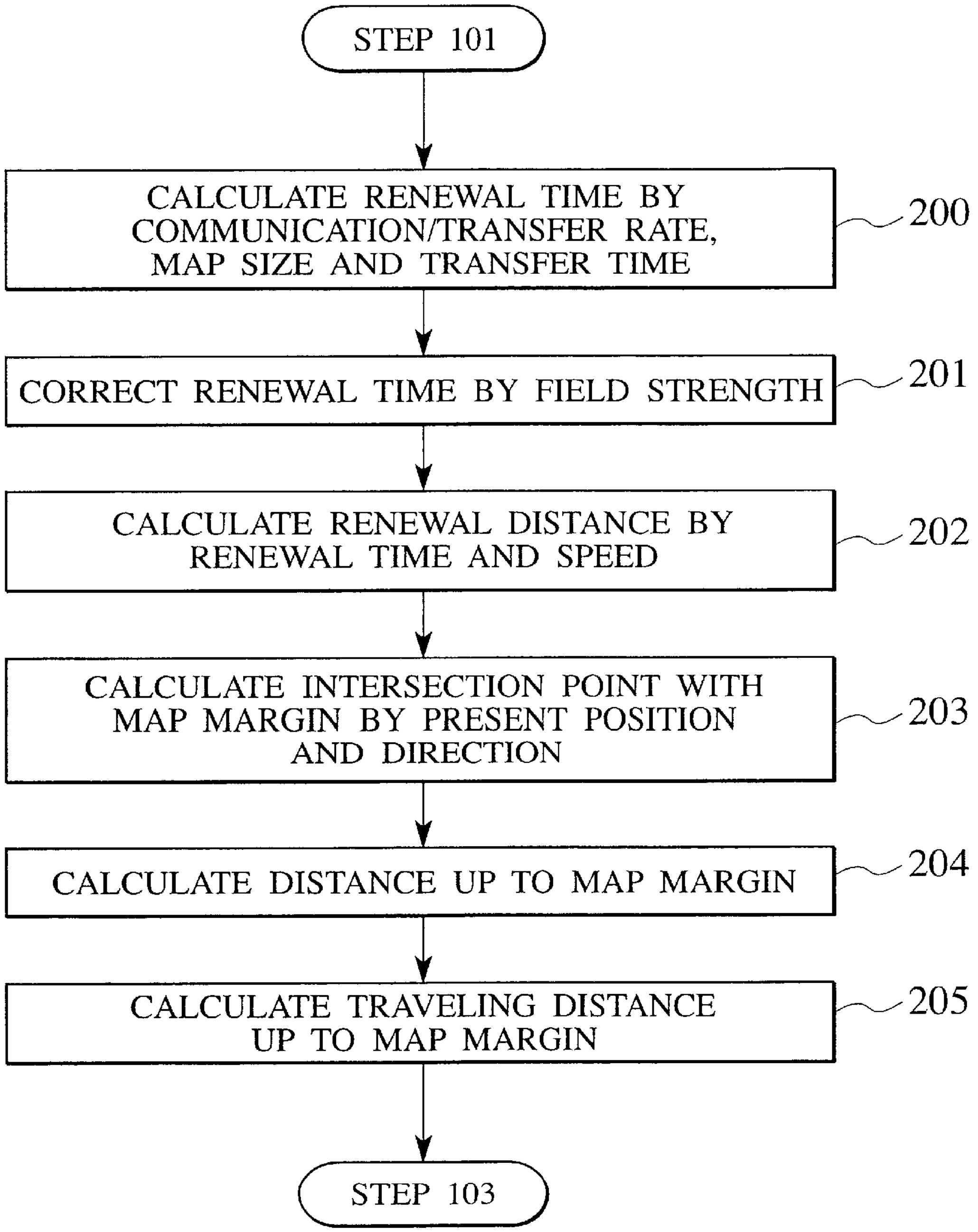
FIG. 3 is a flow chart showing the details of a calculation of timing to gain the map.

FIG. 3 is a flow chart showing the details of the calculation of timing for gaining the map.

At step 200, it is executed to calculate a renewal period (time) necessary to renew a map by the communication/transfer rate at the communication part 14, size of the map to be displayed, attestation time of code numbers, etc.

We now describe one example of calculating the renewal time required for renewing a map.

Note, it is assumed that the calculating conditions are 9600 bps in the communication/transfer rate; 148888 bytes in the map size (horizontal: 320 points; vertical: 240 pts.); and 119104 bits in the amount of information.

Therefore, the time required to transfer the map information is calculated as follows:

$$119104 \div 9600 = 12.4 \text{ (sec.)}$$

Further, when assuming that it takes fifteen (15) seconds to attest the code numbers and also one (1) second to shift a cursor (which is normally equal to the interval to detect the position in GPS), the renewal time required for renewing the map is as follows:

$$12.4 + 15 + 1 = 28.4 \text{ (sec.)}$$

At next step 201, while using a correction coefficient $\alpha$ determined by the electric field strength detected by the communication part 14, it is executed to correct the so-calculated renewal time t as follows:

$$T = \alpha \times t$$

wherein (t) is a renewal time before correction, and (T) is a renewal time corrected by the electric field strength.

Corresponding to the electric field strength, the correction coefficient $\alpha$ has a value of 1 when the strength of a radio wave is more than a predetermined value. While, when the strength of a radio wave is less than the predetermined value, the smaller the electric field strength gets, the less the value of correction coefficient $\alpha$ becomes.

At step 202, the renewal time T necessary for the renewal of map is multiplied by the traveling speed of the vehicle thereby to calculate a moving distance that the vehicle has traveled during renewing the map.

For example, if the vehicle travels at 40 km/h, the moving distance that the same vehicle is traveling for one second is as follows:

$$40 \text{ km/h} = 40000 \text{ (m)}/3600 \text{ (sec)} = 11.11 \text{ (m/sec)}$$

Therefore, at the vehicle's speed of 40 km/h, the moving distance that the vehicle travels for the renewal period of 28.4 sec. is as follows:

$$11.11 \times 28.4 = 316 \text{ m}$$

At step 203, it is executed to calculate the coordinates of an intersection point between the vehicle and respective margins of the map or extensions of the margins, by the present position of the vehicle and a traveling direction thereof.

At step 204, it is executed to calculate a distance between the vehicle's position and the intersection point. Owing to this calculation of the distance between the vehicle's position and the intersection point, it is possible to judge a position (or area) through which the vehicle will travel out of the map on display.

Figure 4A:
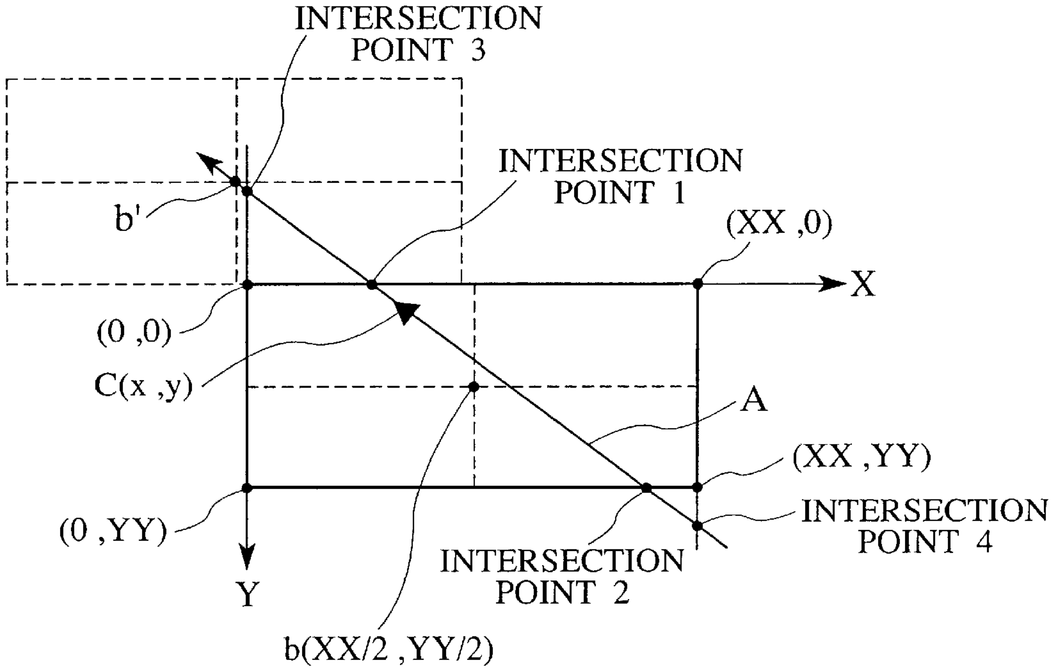
FIGS. 4A and 4B are explanatory diagrams to set both center position and area for obtaining the map information.
Figure 4B:
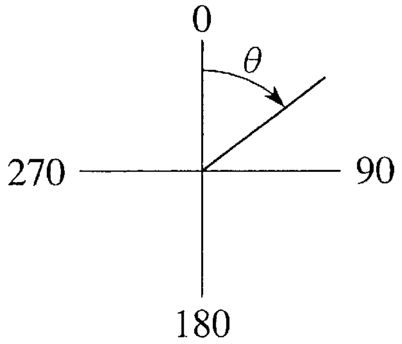

We now describe this judgment in detail, with reference to FIGS. 4A and 4B.

First, it is carried out to establish a line A passing through the detected present position c (x, y) and also having the same angle as the traveling direction of the vehicle. As to the inclination θ of the line A, it is established that the inclination angle has a positive value in the clockwise direction while standardizing the negative direction of Y-axis.

Consequently, the line A will be expressed by the following calculation formula.

$$Y=-(\cos\theta/\sin\theta)(X-x)+y \tag{1}$$

Next, various intersection points of the line A with the respective margins of the map (or extension line of the margins) are calculated and furthermore, distances between the intersection points and the present position of the vehicle are calculated as well.

Now, it is assumed that the intersection point with the upper margin is identical to a point 1, the same with the lower margin a point 2, the same with the left margin a point 3 and the intersection point with the right margin is identical to a point 4.

(1) As to the coordinates of the point 1, its X-coordinate can be obtained by inserting a condition of "Y=0" into the calculation formula of line A. As a result, a distance D between the point 1 and the position c (x, y) can be obtained as follows.

$$0=-(\cos\theta/\sin\theta)(X-x)+y$$

$$-y=-(\cos\theta/\sin\theta)X+(\cos\theta/\sin\theta)x$$

$$-y-(\cos\theta/\sin\theta)x=-(\cos\theta/\sin\theta)X$$

$$y+(\cos\theta/\sin\theta)x=(\cos\theta/\sin\theta)X$$

$$y(\sin\theta/\cos\theta)+x=X$$

$$X=(\sin\theta/\cos\theta)y+x$$

Therefore, the distance D from the point (x, y) to the intersection point 1(X, 0) is as follow.

$$D=\sqrt{[(x-X)^2+(y-0)^2]}=\sqrt{\{x-[(\sin\theta/\cos\theta)y+x]\}^{2+y^2}} \tag{2}$$

(2) As to the coordinates of the point 2, its X-coordinate can be obtained by inserting a condition of "Y=YY" into the calculation formula of line A. As a result, a distance D between the point 2 and the position c (x, y) can be obtained as follows.

$$YY=-(\cos\theta/\sin\theta)(0-x)+y$$

$$-(\sin\theta/\cos\theta)(YY-y)=X-x$$

$$X=-(\sin\theta/\theta)(YY-y)+x$$

Therefore, the distance D from the point 1 (x, y) to the intersection point 2 (0, YY) is as follows.

$$D=\sqrt{\{x-[-(\sin\theta/\cos\theta)(YY-y)+x]\}^{2+(y-YY)^2}} \tag{3}$$

(3) As to the coordinates of the point 3, its Y-coordinate can be obtained by inserting a condition of "X=0" into the calculation formula of line A. As a result, a distance D between the point 3 and the position c (x, y) can be obtained as follows.

$$Y=-(\cos\theta/\sin\theta)(0-x)+y$$

$$Y=(\cos\theta/\sin\theta)x+y$$

Therefore, the distance D from the point 1 (x, y) to the intersection point 3 is as follow.

$$D=\sqrt{(x-0)^2+\{y-[(\cos\theta/\sin\theta)x+y]\}^2}=\sqrt{x^2+\{y-[(\cos\theta/\sin\theta)x+y]\}^2} \tag{4}$$

(4) As to the coordinates of the point 4, its Y-coordinate can be obtained by inserting a condition of "X=XX" into the calculation formula of line A. As a result, a distance D between the point 4 and the position c (x, y) can be obtained as follows.

$$Y=-(\cos\theta/\sin\theta)(X-x)+y$$

Therefore, the distance D from the point 1 (x, y) to the intersection point 4 is as follow.

$$D=\sqrt{(x-XX)^{2+\{y-[-(\cos\theta/\sin\theta)(X-x)+y]\}^2}} \tag{5}$$

In summary, the distances D between the present position of the vehicle and the respective intersection points are as follows.

Intersecting point 1 (point with $Y=0$) (2)

$$D=\sqrt{\{x-[(\sin\theta/\cos\theta)y+x]\}^2+y^2}$$

Intersecting point 2 (point with $Y=YY$) (3)

$$D=\sqrt{\{x-[-(\sin\theta/\cos\theta)(YY-y)+x]\}^2+(y-YY)^2}$$

Intersecting point 3 (point with $X=0$) (4)

$$D=\sqrt{(x^2+[y-(\cos\theta/\sin\theta)x+y]^2}$$

Intersecting point 4 (point with $X=XX$) (5)

$$D=\sqrt{(x-XX)^2+\{y-[-(\cos\theta/\sin\theta)(X-x)+y]\}^2}$$

At step 205, it is executed to examine the magnitude of θ representing the traveling direction of the vehicle and also calculate the traveling distance of the vehicle due to the calculation between the present position and two or one intersection point.

That is, if the condition 1 of "0<θ<90" stands up, then the distances between the present position and the points 1, 4 are calculated thereby to select a shorter one as the road distance that the vehicle will travel.

If the condition 2 of "90<θ<180" stands up, then the distances between the present position and the points 2, 4 are calculated thereby to select a shorter one as the road distance that the vehicle will travel.

If the condition 3 of "180<θ<270" stands up, then the distances between the present position and the points 2, 3 are calculated thereby to select a shorter one as the road distance that the vehicle will travel.

If the condition 4 of "270<θ<360" stands up, then the distances between the present position and the points 3, 1 are calculated thereby to select a shorter one as the road distance that the vehicle will travel.

If the condition 5 of "θ=0" stands up, then a value of "y" is determined as the road distance that the vehicle will travel.

If the condition 6 of "θ=90" stands up, then a value of "XX−x" is determined as the road distance that the vehicle will travel.

If the condition 7 of "θ=180" stands up, then a value of "YY−y" is determined as the road distance that the vehicle will travel.

If the condition 8 of "θ=270" stands up, then a value of "x" is determined as the road distance that the vehicle will travel.

In this way, there are obtained the moving distance for judgment of timing of gaining the map and the road distance required for the vehicle to travel to the margin of the map.

Figure 2:
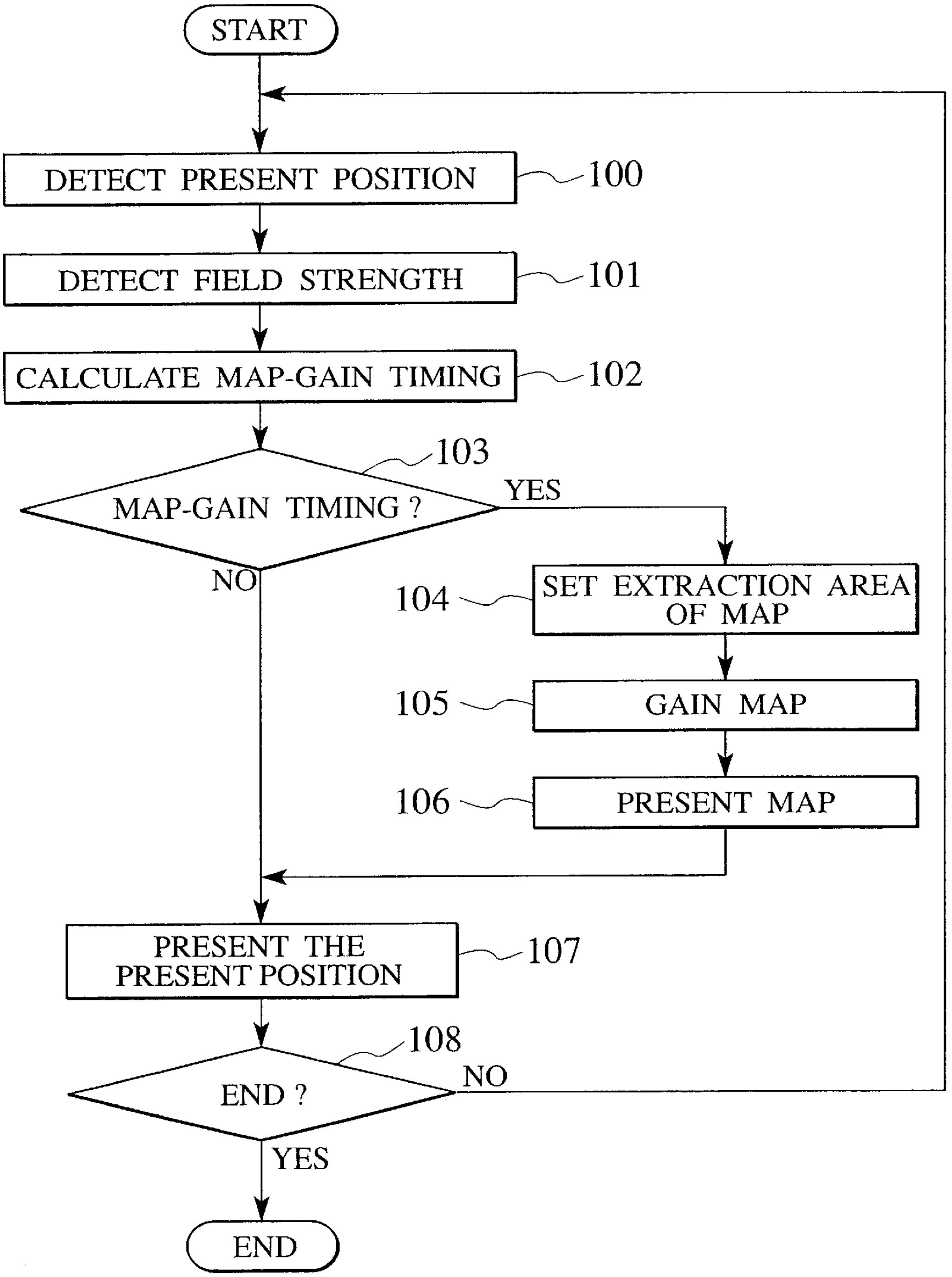
FIG. 2 is a flow chart showing the flow of control of the embodiment.

Returning to the flow chart of FIG. 2, at step 103, it is executed to compare the moving distance with the road distance in order to judge whether the timing has come to gain the map. If the moving distance agrees with the road distance, then the routine goes to step 104 to carry out the renewal of map. On the other hand, if the moving distance does not agree with the road distance, the routine goes to step 107.

At step 104, the extraction-area setting part 16 establishes an extraction area of the map. The establishment for the extraction area will be described with reference to FIGS. 4A and 4B.

It should be noted that, after the renewal of map, there are map-center positions with every intersection points. These map-center positions (i.e. coordinates of the respective centers of maps) are obtained by the following formulas.

(1) In case of the intersection point 1, the Y-coordinate of the center of the renewed map is equal to −YY/2 because the same Y-coordinate of the center of the previous map is equal to YY/2.

Therefore, the X-coordinate of the center of the renewed map will be obtained as follows.

$$-(YY/2)=-(\cos\theta/\sin\theta)(X-x)+y$$

$$-(YY/2)-y=-(\cos\theta/\sin\theta)(X-x)$$

$$(YY/2)+y=(\cos\theta/\sin\theta)(X-x)$$

$$(\sin\theta/\cos\theta)[(YY/2)+y]=X-x$$

$$X=(\sin\theta/\cos\theta)[(YY/2)+y]+x$$

Therefore, the center of the renewed map can be expressed by the coordinates of:

$$\{(\sin\theta/\cos\theta)[(YY/2)+y]+x;-YY/2\}$$

(2) In case of the intersection point 2, the Y-coordinate of the center of the renewed map is equal to 3YY/2 (=YY+(YY/2)).

Therefore, the X-coordinate of the center of the renewed map will be obtained as follows.

$$3(YY/2)=-(\cos\theta/\sin\theta)(X-x)+y$$

$$3(YY/2)-y=-(\cos\theta/\sin\theta)(X-x)$$

$$-3(YY/2)+y=(\cos\theta/\sin\theta)(X-x)$$

$$(\sin\theta/\cos\theta)[y-3(YY/2)]=X-x$$

$$X=(\sin\theta/\cos\theta)[y-3(YY/2)]+x$$

Therefore, the center of the renewed map can be expressed by the coordinates of:

$$\{(\sin\theta/\cos\theta)[y-3(YY/2)]+x;\ 3(YY/2)\}$$

(3) In case of the intersection point 3, the X-coordinate of the center of the renewed map is equal to −XX/2 because the same X-coordinate of the center of the previous map is equal to XX/2.

Therefore, the Y-coordinate of the center of the renewed map will be obtained as follows.

$$Y = -(\cos\theta/\sin\theta)[-(XX/2)-x]+y$$
$$= (\cos\theta/\sin\theta)[(XX/2)+x]+y$$

Therefore, the center of the renewed map can be expressed by the coordinates of:

$$\{-XX/2;\ (\cos\theta/\sin\theta)[(XX/2)+x]+y\}$$

(4) In case of the intersection point 4, the X-coordinate of the center of the renewed map is equal to 3XX/2 (=XX+(XX/2)).

Therefore, the Y-coordinate of the center of the renewed map will be obtained as follows.

$$Y=-(\cos\theta/\sin\theta)[3(XX/2)-x]+y$$

Therefore, the center of the renewed map can be expressed by the coordinates of:

$$\{3(XX/2);\ -(\cos\theta/\sin\theta)[3(XX/2)-x]+y\}$$

At step 105, the map gaining part 17 transmits the information of map to be extracted (i.e. a position of a map center calculated by the extraction-area setting part 16; a distance of XX in the vertical direction and a distance YY in the horizontal direction as the area information; a reduced scale) to the map information delivery apparatus 1 through the communication part 14.

On receipt of the information, the map extracting part 40 of the map information delivery apparatus 1 extracts the corresponding map information out of the map information storing part 10 and further delivers the so-extracted map information to the navigation system 2 through the communication part 12.

Then, the map gaining part 17 outputs the received map information to the map presenting part 18.

At step 106, the map presenting part 18 converts the gained map information into an image data and further outputs the image data to the display unit 20 where the map image is renewed.

At step 107, it is executed to calculate the displaying position of a cursor by the vehicle's present position detected by the GPS unit 13 and also the map information on display and further executed to display the calculated cursor on the display unit 20. For example, the cursor is in the form of an arrow whose pointing direction is established so as to coincide with the traveling direction of the vehicle.

At step 108, it is judged whether the navigation system 1 is in operation or not. If the navigation system 1 is in operation, then the routine returns to step 100 and thereafter, the above-mentioned processes are carried out repeatedly. While, if the navigation system 1 comes to a standstill in operation, the whole process is ended.

According to this embodiment of the invention, the GPS unit 13 forms the position detecting means of the invention, while the communication part 14 forms the communicating means of the invention. In the above-mentioned flow chart, the processes at steps 200, 201 form the renewal time calculating means, the process at step 202 the moving distance calculating means, and the processes at steps 203 to 205 form the road distance calculating means of the invention.

Additionally, the process at step 103 forms the comparing means, the process at step 104 the map extracting area setting means, and the processes at steps 105, 106 form the map gaining means of the invention.

As mentioned above, according to the embodiment of the invention, the renewal time for renewing the map is calculated and further, the moving distance that the vehicle travels from the start of renewal till the finish of renewal is calculated by the above renewal time and the traveling speed of the vehicle. Further, while comparing the calculated moving distance with the road distance required for the vehicle to reach the margin of map, when the calculated moving distance agrees with the road distance, the new map information is gained from the server thereby to renew the present map. Accordingly, there is no possibility of missing a map on display and also no possibility of gaining the map information having overlapping areas. Thus, it is possible to utilize the map information of low cost at the maximum.

Additionally, according to the above-mentioned embodiment, since the road distance is defined by a distance from the position of the vehicle to the intersection point between a straight line passing through the position of the vehicle with the same inclination as the traveling direction and the margin of the map, it is possible to calculate the road distance even if the map information is displayed in the form of bit-map data and also provided with any road information.

Note, if the road distance corresponds to a distance along the road (road part) on which the user's vehicle is traveling and further the map information having the road information is employed, then it is possible to obtain an accurate road distance.

In the above-mentioned embodiment, the traveling speed of the vehicle is calculated by a time change of the vehicle's position. In the modification, the traveling speed of the vehicle may be determined by the following steps. That is, the sort of a road on which the vehicle is now traveling is judged from, for example, the map information and subsequently, a speed predetermined corresponding to the sort of road is employed as the traveling speed of the vehicle. In detail, for example, the traveling speeds of 30 km/h and 80 km/h are established for normal roads and freeways, respectively. In this case, it is possible to determine the traveling speed of the vehicle with ease.

In a further modification, on the assumption that a specific road segment is established by two points (e.g. points A, B) on map, the traveling speed may be calculated by a distance between the point A and the point B and a time that the vehicle took to travel between the point A and the point B.

For example, if TA represents a time when the vehicle has passed through the point A (X1, Y1) while TB represents a time when the vehicle has passed through the point B (X2, Y2), the traveling speed V can be calculated as follows.

$$D=\sqrt{(X2-X1)^2+(Y2-Y1)^2}$$

$$V=D/(TB-TA)$$

Also in this case, it is possible to determine the traveling speed of the vehicle with ease.

Alternatively, on the assumption of establishing a plurality of road segments (T1, T2 . . . , Tn), the traveling speed may be calculated by averaging traveling speeds V1, V2, . . . , Vn that can be obtained for the respective segments T1, T2, . . . , Tn, as follows. In this case, it is possible to improve the accuracy of the calculated traveling speed furthermore.

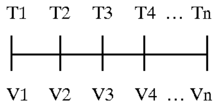

$$V=\sum_{k=1}^{n} Vk/n$$

We now describe some modifications of the above embodiment of the present invention.

In the above embodiment, the road distance is calculated on the assumption that the vehicle goes straight on ahead. In the modification, the road distance may be obtained from the road information of the map information.

Figure 5:
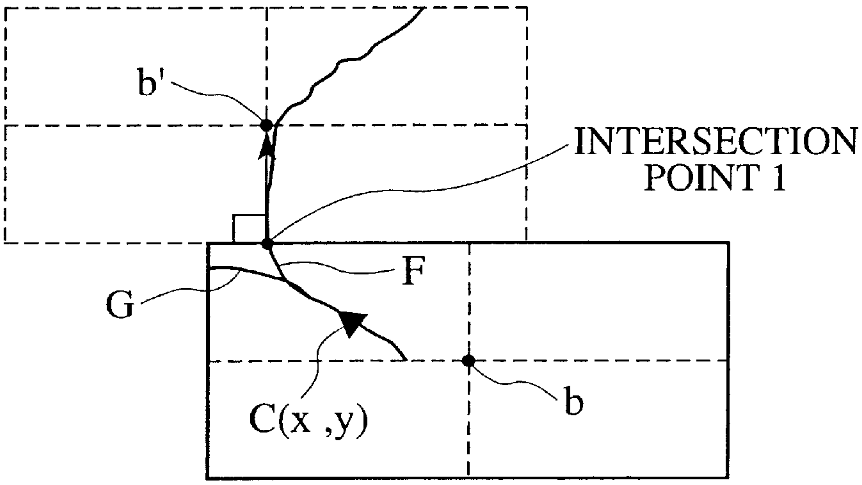
FIG. 5 is a diagram for explanation of the modification of the embodiment.

If the road branches out on its way to the margin of the map, then it is performed to calculate respective road distances about resultant branch lines, for example, branch lines G, F as shown in FIG. 5. Then, the so-calculated road distances are compared with each other and a shorter one is adopted as the road distance.

In connection, the area of the map information to be gained is calculated on the basis of the road information. That is, on the establishment of an intersection point of the shorter road intersecting with the margin of the map as the starting point, a point vertically or horizontally separated from the intersection point at half the vertical or horizontal length of the display area is adopted as a center b' of the map. Consequently, it becomes possible to gain a new map information before the vehicle's vanishing from the present map on display, irrespective of which of the branch roads the vehicle has traveled actually.

According to the above-mentioned embodiment, the renewal time is corrected by the electric field strength. Therefore, even if the communication rate is degraded to maintain the quality of communication, it is possible to calculate the renewal time precisely.

Furthermore, since the map area to be gained is determined on the ground of the position of the intersection point between the road on which the vehicle is present and the margin of the map on display, it is possible to obtain the proper map information corresponding to an actual moving situation of the vehicle.

Finally, it will be understood by those skilled in the art that the foregoing descriptions are nothing but one embodiment and the modifications of the disclosed navigation system for a vehicle. Besides these embodiments, various changes and modifications may be made to the present invention without departing from the spirit and scope of the invention.

Japanese Patent Application Serial No. 2001-203935, filed on Jul. 4, 2001, is expressly incorporated herein by reference in its entirety.

The scope of the invention is defined with reference to the following claims.

What is claimed is:

1. A navigation system for a vehicle, comprising:

a communication unit connected to a server for delivering a map information;

a map gaining unit connected to the communication unit thereby to gain the map information from the server through the communication unit;

a display unit connected to the map gaining unit thereby to display the map information gained by the map gaining unit, in the form of a map image;

a position detecting unit for detecting the position of the vehicle;

a renewal time calculating unit for calculating a renewal time necessary to renew the map, the renewal time including a time for gaining the map information;

a moving distance calculating unit for calculating a moving distance of the vehicle traveling during the renewal of the map;

a road distance calculating unit for calculating a road distance required for the vehicle to travel from its present position to a margin of the map displayed on the display unit;

a comparing unit for comparing the road distance with the moving distance; and an extraction-area setting unit for establishing the area of a new map to be displayed next to the map presently displayed on the display unit when the road distance agrees with the moving distance;

wherein the map gaining unit transmits information about the area of the new map established by the extraction-area setting unit, to the server through the communication unit and further gains a new map information from the server thereby to carry out the renewal of the map displayed on the display unit.

2. The navigation system of claim 1, wherein the road distance calculating unit calculates a traveling direction of the vehicle by a positional change thereof and the road distance calculated by the road distance calculating unit is equal to a distance from the position of the vehicle to an intersection point between a straight line passing through the position of the vehicle with the same inclination as the traveling direction and a margin of the map presently displayed on the display unit.

3. The navigation system of claim 1, wherein the road distance calculated by the road distance calculating unit is equal to a distance along a road part extending from the present position of the vehicle up to an intersection point between a road on which the vehicle is traveling and a margin of the map presently displayed on the display unit.

4. The navigation system of claim 3, wherein, when a road that the vehicle is present branches off into branch roads before reaching the margin of the map on display, the road distance calculating unit calculates respective distances required for the vehicle to travel from the present position to the margin of the map through the branch roads and wherein a shorter distance of the calculated distances is established as the road distance.

5. The navigation system of claim 1, wherein the moving distance calculating unit calculates a traveling speed of the vehicle by a time change in the position of the vehicle thereby to calculate the moving distance by the calculated traveling speed and also the renewal time of map.

6. The navigation system of claim 5, wherein the moving distance calculating unit judges the sort of a road where the vehicle is present and adopts a speed predetermined corresponding to the sort of the road, as the traveling speed of the vehicle.

7. The navigation system of claim 5, wherein the moving distance calculating unit calculates the traveling speed of the vehicle by a time that the vehicle took to travel a predetermined road segment and a distance of the predetermined road segment.

8. The navigation system of claim 7, wherein the moving distance calculating unit calculates the traveling speeds of the vehicle with respect to a plurality of predetermined road segments and adopts an average of the so-calculated traveling speeds as the traveling speed of the vehicle.

9. The navigation system of claim 1, wherein the extraction-area setting unit determines the area of a map to be gained, on the ground of the present position of the vehicle, a traveling direction thereof and information about the size of a map to be displayed.

10. The navigation system of claim 1, wherein the extraction-area setting unit determines the area of a map to be gained, on the ground of the position of an intersection point between a road on which the vehicle is traveling and the margin of the map displayed on the display unit presently.

11. The navigation system of claim 1, wherein the communication unit measures an electric field strength of a radio wave transmitted to and from the server, while the renewal time calculating unit carries out correction of the renewal time by a value of the so-measured electric field strength.

12. The navigation system of claim 1, wherein the vehicle comprises a vehicle.

13. A navigation system for a vehicle, comprising:

communication means for communicating the navigation system with a server for delivering a map information;

map gaining means for gaining the map information from the server;

a display unit for displaying the map information gained by the map gaining means, in the form of a map image;

means for detecting the position of the vehicle;

means for calculating a renewal time necessary to renew the map, the renewal time including a time for gaining the map information;

means for calculating a moving distance of the vehicle traveling during the renewal of the map;

means for calculating a road distance required for the vehicle to travel from its present position to a margin of the map displayed on the display unit;

means for comparing the road distance with the moving distance; and extraction-area setting means for establishing the area of a new map to be displayed next to the map presently displayed on the display unit when the road distance agrees with the moving distance;

wherein the map gaining means transmits information about the area of the new map established by the extraction-area setting unit, to the server through the communication means and further gains a new map information from the server thereby to carry out the renewal of the map displayed on the display unit.

* * * * *